United States Patent Office 3,644,376
Patented Feb. 22, 1972

3,644,376
1-(β-HYDROXYETHOXY-ETHYL) - 4 - PARA-CHLOROBENZYLPIPERIDINE AND ITS LOWER ALKANOYL DERIVATIVES
Yasunobu Sato, Hiromu Takagi, Teruo Tanaka, and Katsuo Kamoshida, Tokyo, Japan, assignors to Sankyo Company Limited, Chyuo-ku, Tokyo, Japan
No Drawing. Filed Apr. 10, 1969, Ser. No. 815,176
Claims priority, application Japan, Apr. 11, 1968, 43/24,167; Apr. 12, 1968, 43/24,389
Int. Cl. C07d 27/24
U.S. Cl. 260—293.82
3 Claims

ABSTRACT OF THE DISCLOSURE

Novel benzylpiperidine derivatives having the formula

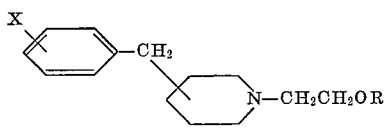

wherein X is a halogen atom, preferably chlorine atom, and R is a hydroxyalkyl group having 2 to 4 carbon atoms, preferably β-hydroxyethyl group, or an acyloxyalkyl group having 2 to 4 carbon atoms in the alkyl moiety, the acyl moiety of which may be an aliphatic acyl group having 2 to 5 carbon atoms or an aromatic acyl group having 6 or 10 carbon atoms in the aromatic ring, preferably β-acetoxyethyl group. These novel benzylpiperidine derivatives are useful as a non-narcotic antitussive agent and they are prepared by (A) reacting a benzylpyridine derivative having the formula

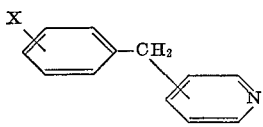

wherein X is as defined above with a substituted alkyl halide having the formula $$XCH_2CH_2OR$$

wherein R and X are as defined above followed by subjecting the intermediate pyridinium salt to a catalyic reduction or (B) a benzylpiperidine derivative having the formula

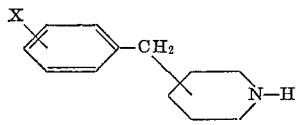

wherein X is as defined above with the above-mentioned substituted alkyl halide.

---

This invention relates to a new class of benzylpiperidine derivatives and a process for preparing the same.

More particularly, it relates to a benzylpiperidine derivative having the formula

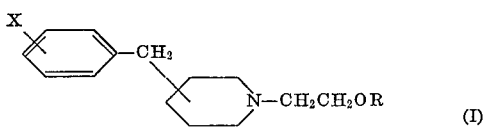

wherein X is a halogen atom and R is a hydroxyalkyl group having 2 to 4 carbon atoms or an acyloxylalkyl group having 2 to 4 carbon atoms in the alkyl moiety, the acyl moiety of which is an aliphatic acyl group having 2 to 5 carbon atoms or an aromatic acyl group having 6 or 10 carbon atoms in the aromatic ring. Also, it relates to a process for the preparation of the benzylpiperidine derivative of the above Formula I.

In the above Formula I, the substituent X may be illustratively represented by chlorine, bromine, fluorine or iodine atom and the group R may be illustratively represented by 2-hydroxyethyl, 3-hydroxy-n-propyl, 4-hydroxy-n-butyl, 2-acetoxyethyl, 2-n-propionyloxyethyl, 2-n-butyryloxyethyl, 3-acetoxy-n-propyl, 3-tert.-butryloxy-n-butyl, 2-benzoyloxyethyl, 2-naphthoyloxyethyl and the like. The substituent X may be attached to any unsubstituted ring carbon atom in the benzyl moiety, which may be linked to the piperidine moiety at any ring carbon atom thereof.

The benzylpiperidine derivatives (I) of this invention are all novel substances unknown in the prior art. They exhibit an excellent non-narcotic antitussive activity and thus they are useful as a potent non-narcotic antitussive agent for the relief of various types and severities of coughs.

It is, accordingly, a primary object of this invention to provide the new benzylpiperidine derivative of the above Formula I which can be effectively employed as a medicine for the treatment of coughs.

It is another object of this invention to provide a process for the preparation of the benzylpiperidine derivative of the above Formula I.

These and other objects of this invention will become apparent from the description of this invention.

Heretofore it was reported in the Journal of New Drugs, 6, 122 (1966) that N - dimethylaminoethyl - 4-benzylpiperidine had a considerable degree of antitussive activity among benzylpiperidine derivatives.

As a result of our extensive and further investigations on the preparation and biological activity, especially antitussive one, of benzylpiperidine derivatives, it has now been found that the novel benzylpiperidine derivatives of the above Formula I can be advantageously synthesized and also that they show an exceptionally high degree of antitussive activity with a substantially lower toxicity and, in particular, the antitussive activity thereof is non-narcotic, as compared with the known antitussive benzylpiperidine derivative described hereinabove.

The benzylpiperidine derivatives (I) of this invention, as explained hereinabove, possess a potent nonnarcotic antitussive activity and they may be favourably employed for the treatment of various types and severities of coughs. Of these novel benzylpiperidine derivatives are preferred the benzylpiperidine derivatives having the formula

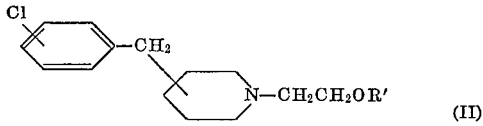

wherein R' is β-hydroxyethyl group or a β-(aliphatic acyloxy)ethyl group having 2 to 5 carbon atoms in the acyl moiety. Representative examples of the preferred group of the benzylpiperidine derivatives of the above Formula II include 1-(β-hydroxyethoxyethyl)-4-p-chlorobenzylpiperidine and
1-(β-acetoxyethoxyethyl)-4-p-chlorobenzylpiperidine.

The novel benzylpiperidine derivatives (I) of this invention may be orally or parenterally administered for the treatment of coughs. These active compounds may be employed for the treatment of coughs in the form of a pharmaceutical preparation which comprises the benzylpiperidine derivative (I) and a pharmaceutically acceptable carrier. The pharmaceutical preparation may be in the form of oral preparations including tablets, capsules, powders, oral suspensions and syrups, or parenteral preparations including injectable solutions and suspensions. In making up these preparations, there may be employed any of pharmaceutically acceptable carriers commonly used in the art. Examples of such carriers are pharmaceutical vehicle, binder or filler such as water, starch, gelatin, lactose, talc, cellulosic materials, magnesium stearate, vegetable oils, gum and any other known material. These pharmaceutical preparations may, if desired, contain various kinds and types of auxiliary agents, such as preserving agents, stabilizing agents, emulsifying agents, buffers or salts for adjusting osmotic pressure and they may be also sterilized in a conventional manner.

The amount to be administered for the treatment of coughs, that is, the dosage of the active benzylpiperidine derivative (I) should be determined by skilled physicians taking consideration of the ages and weights of patients, types and severities of coughs and other factors. There is usually employed the total daily dosage for adults of about 30 to 45 mg., preferably in multiple doses such as three or more times a day, while larger total daily dosages may be effectively employed in some cases, the above dosage being based upon the form of a free base of the active benzylpiperidine derivative. Moreover, the active benzylpiperidine derivative (I) of this invention may be continuously and satisfactorily administered to patients for a long period of time, based upon types and severities of coughs.

In another aspect of this invention, there is provided a process for the preparation of the benzylpiperidine derivative (I), which comprises (A) reacting a benzylpyridine derivative having the formula

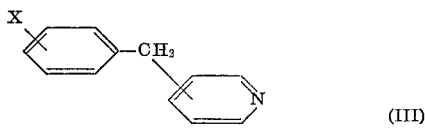

wherein X is as defined above with a substituted alkyl halide having the formula $$XCH_2CH_2OR \quad (IV)$$

wherein R and X are as defined above to form the corresponding pyridinium compound followed by subjecting the pyridinium compound to a catalytic reduction (hereinafter referred to as "Process A") or (B) reacting a benzylpiperidine derivative having the formula

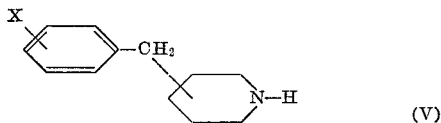

wherein X is as defined above with the substituted alkyl halide having the above Formula IV (hereinafter referred to as "Process B").

In the process of this invention, the above Process A comprises two steps of reacting the benzylpyridine derivative (III) with the substituted alkyl halide (IV) to form an intermediate pyridinium salt and of subjecting the intermediate pyridinium salt to a catalytic reduction thereby yielding the desired benzylpiperidine derivative (I). In carrying out Process A, the first step, i.e. the production of the intermediate pyridinium salt from the starting benzylpyridine derivative (III) may be conducted in the presence or absence of a solvent, usually and preferably in the absence of a solvent. As a solvent, if employed, may be utilized any of such solvents that will not adversely affect the reaction in this step. Preferred examples of such solvents include polar solvents, e.g. methanol, ethanol and the like. The reaction temperature is not a critical feature of this invention, but it is usual to conduct the reaction at about 100–170° C., if a reaction solvent is not employed, or at a reflux temperature of the reaction solvent, if employed. Higher or lower temperatures may, of course, be employed in this step. The reaction period may be widely varied upon the reaction temperature employed and other factors, but usually it is in the range of about 3 to 10 hours.

After completion of the reaction, the intermediate pyridinium salt may be easily recovered from the reaction mixture by a conventional means. For instance, the reaction mixture is poured into a suitable amount of water and the resulting mixture is filtered to remove insoluble materials. The filtrate is concentrated under reduced pressure and the residue is washed with a suitable solvent, e.g. ether to give the intermediate pyridinium salt as crystalline or oily substance. The intermediate pyridinium salt may be employed in the subsequent second step without further purification.

The second step in Process A, i.e. the catalytic reduction of the intermediate pyridinium salt to the desired benzylpiperidine derivative (I) may be easily conducted according to a conventional catalytic reduction procedure well known to those skilled in the art. Thus, as a reaction solvent and a catalyst for catalytic reduction may be favourably employed any of those conventionally employed in the art for catalytic reduction. Representative of the reaction solvent are methanol, ethanol, ether, acetic acid, aqueous methanol, aqueous ethanol, aqueous dioxane, aqueous acetic acid and the like, but are preferable such aqueous alcohols as aqueous methanol, aqueous ethanol and the like. Representative of the catalyst are various forms of platinum, palladium or nickel catalysts, but are preferable platinum oxide catalyts. The reduction may be conducted with $H_2$ gas at ordinary or atmospheric pressure or under pressure, but ordinary or atmospheric pressure of $H_2$ gas may be usually employed in the step.

After completion of the reaction, the desired benzylpiperidine derivative (I) may be recovered from the reaction mixture by a conventional means. For instance, the reaction mixture is filtered to remove the catalyst and the filtrate is concentrated under reduced pressure to recover the desired product in the form of the corresponding hydrohalic acid additon salt as crystalline substance and the desired product may also be recovered in the form of a free base by further treatment of the acid addition salt obtained as above, for example, by addition of a suitable aqueous alkali to said salt, extraction with a suitable solvent, e.g. ether, removal of the solvent through distillation and distillation of the residue under reduced pressure.

The above-mentioned Process B in the process of the invention involves reaction of the starting benzylpiperidine derivative (V) with the substituted alkyl halide (IV) in the presence or absence of an acid binding agent to form the desired benzylpiperidine derivative (I). The reaction in this Process B may be carried out in the presence or absence of a reaction solvent.

As a reaction solvent may be employed any of such solvents that will not adversely affect the reaction, but preferred examples of the reaction solvent include hydrocarbons, e.g. benzene, toluene and xylenes; ethers, e.g. dioxane; and the like. Suitable examples of the acid binding agent include inorganic bases such as alkali metal hydroxides, e.g. sodium hydroxide; alkali metal carbonates, e.g. sodium or potassium carbonate; alkali metal bicarbonates, e.g. sodium or potassium bicarbonate, as well as organic bases such as tertiary amines, e.g. triethylamine, or N-methylpyrrolidine; unsaturated heterocyclic bases, e.g. pyridine or quinoline; and the like, but are usual and preferable those tertiary amines. The reaction temperature is not a critical feature, but it is usual and preferable to conduct the reaction at a reflux temperature of the reaction mixture. Higher or lower temperature may be, of course, employed in this Process B. The reaction period may be widely varied upon the reaction temperature employed and other factors, but the reaction is usually completed in about 5 to 20 hours.

In this Process B, the desired product (I) after completion of the reaction is obtained in the form of a free base where an acid binding agent is employed and in the form of the corresponding hydrohalic acid addition salt where such an agent is not employed.

After completion of the reaction, the desired product (I) may be recovered from the reaction mixture by a conventional means. For instance, where an acid binding agent is employed, the reaction mixture is filtered to remove insoluble materials, the solvent is distilled off from the filtrate and the residue is distilled under reduced pressure to recover the desired product in the form of a free base. Where such an agent is not employed, the desired product precipitates in situ in the form of the corresponding hydrohalic acid addition salt and then it is recovered by filtration.

It is also contemplated in this invention that an acid addition salt of the benzylpiperidine derivative (I) is included within the purview of this invention. These acid addition salts of this invention include various inorganic and organic acid addition salts, e.g. hydrochloride, hydrobromide, sulfate, phosphate, p-toluene sulfonate, acetate, palmitate, maleate, oxalate, succinate and the like. The acid addition salts of this invention may be prepared as set forth above or from a free base by a conventional method, for example, by treating the free base with a suitable acid.

It is to be noted that the benzylpiperidine derivatives of the above Formula I wherein the group R is the acyloxyalkyl group as defined above can be converted to the benzylpiperidine derivatives of the above Formula I wherein the group R is the hydroxyalkyl group as defined above through a conventional deacylation, for example, by treating the former in a solvent, e.g. water, ethanol or aqueous ethanol with a suitable strong acid, a.g. hydrochloric acid or sulfuric acid or a suitable strong alkali, e.g. sodium hydroxide.

The process of this invention may be schematically represented by the following chemical equations:

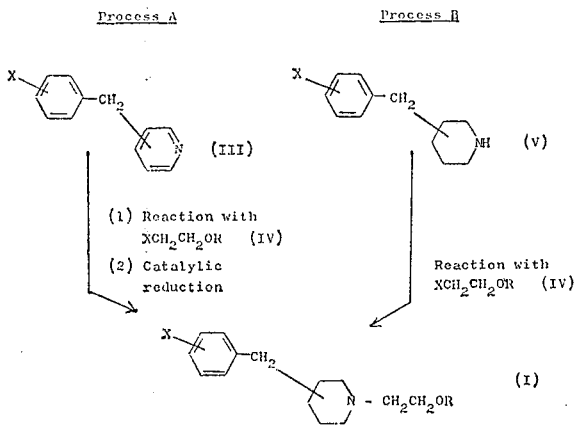

wherein R and X are as defined above.

The following examples are given for the purpose of illustrating the process of this invention. They should not be construed to be limiting the scope of this invention.

Examples 1 and 2 will describe the preparation of the benzylpiperidine derivatives (I) according to Process A and Examples 3 and 4 will describe such preparation according to Process B.

EXAMPLE 1

Preparation of 1-(β-hydroxyethoxyethyl)-4-p-chlorobenzyl-piperidine and its hydrochloride A mixture of 5.4 g. of 4-p-chlorobenzylpyridine and 3 g. of ethylene glycol mono-β-chloroethylether was heated with stirring at a bath temperature of 140° C. to 150° C. for 4 hours. After completion of the reaction, the reaction mixture was cooled to room temperature and dissolved in 20 ml. of water. The aqueous solution thus obtained was shaken with some portions of ether. The aqueous layer was separated from the ether layer, concentrated under reduced pressure and dried in vacuo to give 7.4 g. of the intermediate pyridinium salt.

The pyridinium salt thus obtained was dissolved in 70 ml. of a 50% aqueous ethanol. The solution was subjected to a catalytic reduction under ordinary pressure using 300 mg. of a platinum oxide catalyst. The reduction was ceased when 1,680 ml. of hydrogen was absorbed. After removal of the catalyst by filtration, the filtrate was made alkaline by addition of an aqueous sodium hydroxide solution and the alkaline solution was extracted several times with ether. From the combined ether extracts was distilled off the solvent and the residue was distilled under reduced pressure to give 4 g. of the desired free base as pale yellow oil (B.P. of 160 to 165° C./5.8×10⁻⁴ mm. Hg).

*Analysis.*—For $C_{16}H_{24}ClNO_2$. Calculated (percent): C, 64.52; H, 8.12; N, 4.70; Cl, 11.91. Found (percent): C, 64.27; H, 8.28; N, 4.61; Cl, 11.28.

The free base obtained as above was dissolved in ethanol. The solution was saturated with hydrogen chloride. After removal of the ethanol by distillation under reduced pressure, the residual crystalline substance was recrystallized from a mixture of isopropanol with benzene to give the corresponding hydrochloride as needles melting at 142–144° C.

*Analysis.*—For $C_{16}H_{25}Cl_2NO_2$. Calculated (percent): C, 57.46; H, 7.54; N, 4.19. Found (percent): C, 57.88; H, 7.70; N, 4.29.

EXAMPLE 2

Preparation of 1-(β-acetoxyethoxyethyl)-4-p-chlorobenzylpiperidine

The same procedure as in the above Example 1 was repeated except that 8 g. of 4-p-chlorobenzylpyridine and 6.7 g. of 2-acetoxyethoxyethylchloride were employed instead of 4 g. of the 4-p-chlorobenzylpyridine and 3 g. of ethylene glycol mono-β-chloroethylether and the reduction of the intermedial pyridinium salt was continued until 2850 ml. of hydrogen was absorbed, thereby yielding 6 g. of the desired product boiling at 153–155° C./3×10⁻⁴ mm. Hg.

*Analysis.*—For $C_{18}H_{26}ClNO_3$. Calculated (percent): C, 63.61; H, 7.71; N, 4.12. Found (percent): C, 63.65; H, 8.11; N, 4.45.

EXAMPLE 3

Preparation of 1-(β-hydroxyethoxyethyl)-4-p-chlorobenzylpiperidine

A mixture of 4 g. of 4-p-chlorobenzylpiperidine, 2.63 g. of ethylene glycol mono-β-chloroethylether, 2.88 g. of triethylamine and 30 ml. of dry toluene was heated under reflux with stirring for 19 hours. After completion of the reaction, the reaction mixture was cooled to room temperature, the crystalline substance, triethylamine hydrochloride, which precipitated in situ was removed by filtration and the filtrate was distilled under reduced pressure to yield about 6 g. of oily substance. The oily substance was dissolved in a mixture of chloroform and ethanol and then chromatographed on a column of alumina to remove impurities. From eluate was distilled off the solvent and the residue was distilled under reduced pressure to give 2 g. of the desired product boiling at 160 to 165° C./5.8×10⁻⁴ mm. Hg.

*Analysis.*—For $C_{16}H_{24}ClNO_2$. Calculated (percent): C, 64.52; H, 8.12; N, 4.70; Cl, 11.91. Found (percent): C, 64.35; H, 8.28; N, 4.57; Cl, 11.30.

EXAMPLE 4

Preparation of 1-(β-acetoxyethoxyethyl)-4-p-chlorobenzylpiperidine

The same procedure as in the above Example 3 was repeated except that 3.3 g. of 2-acetoxyethoxyethylchloride was employed instead of 2.63 g. of the ethylene glycol mono-β-chloroethylether and the reaction is conducted for 18 hours, thereby yielding 3 g. of the desired product boiling at 153 to 155° C./3×10⁻⁴ mm. Hg.

*Analysis.*—For $C_{18}H_{26}ClNO_3$. Calculated (percent): C, 63.61; H, 7.71; N, 4.12. Found (percent): C, 63.66; H, 7.95; N, 4.45.

What is claimed is:

1. A compound having the formula

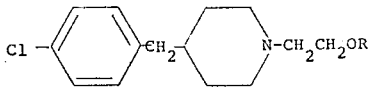

wherein R is β-hydroxyethyl or β-(alkanoyloxy) ethyl having from 2 to 5 carbon atoms in the alkanoyl moiety.

2. 1 - (β - hydroxyethoxyethyl)-4-p-chlorobenzylpiperidine.

3. 1 - (β - acetoxyethoxyethyl)-4-p-chlorobenzylpiperidine.

References Cited

UNITED STATES PATENTS

| | | | |
|---|---|---|---|
| 3,075,986 | 1/1963 | Jacob et al. | 260—294.7 |
| 3,255,196 | 6/1966 | Debarre et al. | 260—294.7 |

HENRY R. JILES, Primary Examiner

G. T. TODD, Assistant Examiner

U.S. Cl. X.R.

260—293.83; 424—267